United States Patent
Namba et al.

(10) Patent No.: US 11,721,818 B2
(45) Date of Patent: Aug. 8, 2023

(54) FUEL CELL SYSTEM AND METHOD OF CONTROLLING FUEL CELL SYSTEM

(71) Applicant: TOYOTA JIDOSHA KABUSHIKI KAISHA, Toyota (JP)

(72) Inventors: Ryouichi Namba, Okazaki (JP); Toshiyuki Sanada, Okazaki (JP); Hiroyuki Tsunekawa, Seto (JP); Yoshihiro Ikogi, Toyota (JP); Masahiro Ito, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 437 days.

(21) Appl. No.: 17/088,108

(22) Filed: Nov. 3, 2020

(65) Prior Publication Data
US 2021/0226235 A1    Jul. 22, 2021

(30) Foreign Application Priority Data

Jan. 16, 2020 (JP) .................... 2020-004868
May 25, 2020 (JP) .................... 2020-090428

(51) Int. Cl.
*H01M 8/0444* (2016.01)
*H01M 8/0432* (2016.01)
*H01M 8/04537* (2016.01)
*H01M 8/04791* (2016.01)
*H01M 8/04225* (2016.01)
*H01M 8/04223* (2016.01)

(52) U.S. Cl.
CPC ..... *H01M 8/04462* (2013.01); *H01M 8/0432* (2013.01); *H01M 8/04225* (2016.02); *H01M 8/04253* (2013.01); *H01M 8/04552* (2013.01); *H01M 8/04559* (2013.01); *H01M 8/04805* (2013.01); *H01M 2250/20* (2013.01)

(58) Field of Classification Search
CPC ......... H01M 8/04462; H01M 8/04805; H01M 8/04225; H01M 8/04268; H01M 8/04302; H01M 8/04253; H01M 8/04552
See application file for complete search history.

(56) References Cited

U.S. PATENT DOCUMENTS

2011/0256461 A1* 10/2011 Imanishi ........... H01M 8/04761
                                                    429/432
2012/0015270 A1    1/2012 Naganuma

FOREIGN PATENT DOCUMENTS

WO    WO 2011/013226 A1    2/2011

* cited by examiner

*Primary Examiner* — Christopher P Domone
(74) *Attorney, Agent, or Firm* — Finnegan, Henderson, Farabow, Garrett & Dunner, LLP

(57) ABSTRACT

A fuel cell system includes a fuel cell in which cells are stacked, a voltage sensor that detects a voltage in unit of one or more of the cells, a control unit that determines an operating point of the fuel cell and causes the fuel cell to operate. The control unit causes the fuel cell to operate at a low efficiency operating point having a lower efficiency than an efficiency of a reference operating point in a warm-up operation. In the warm-up operation, the control unit calculates a total number of the cells in which the voltage detected by the voltage sensor is equal to or less than a predetermined first reference voltage and calculates an exhaust hydrogen concentration based on the total number or the cells.

2 Claims, 10 Drawing Sheets

FUEL CELL SYSTEM AND METHOD OF CONTROLLING FUEL CELL SYSTEM

CROSS-REFERENCE TO RELATED APPLICATION

This application claims priority to Japanese Patent Application No. 2020-004868 filed on Jan. 16, 2020 and Japanese Patent Application No. 2020-090428 filed on May 25, 2020, each incorporated herein by reference in its entirety.

BACKGROUND

1. Technical Field

The present disclosure relates to a fuel cell system and a method of controlling the fuel cell system.

2. Description of Related Art

It is known that, in a warm-up operation with a low efficiency operation, hydrogen ions that are generated in an anode and moved to a cathode receive electrons, whereby pumping hydrogen is generated. When a generation amount of the pumping hydrogen increases, the hydrogen concentration in a cathode off gas (hereinafter referred to as exhaust hydrogen concentration) may increase. WO No. 2011/013226 discloses a method of estimating the generation amount of the pumping hydrogen by correcting a theoretical generation amount of the pumping hydrogen that is derived from an operating current of the fuel cell and the number of cells by a correction coefficient corresponding to a voltage of the fuel cell.

SUMMARY

However, there is still a room for improving the accuracy of estimation of the exhaust hydrogen concentration.

The present disclosure can be implemented in the following modes.

According to one aspect of the present disclosure, a fuel cell system is provided. The fuel cell system includes a fuel cell in which cells are slacked; a voltage sensor configured to detect a voltage in unit of one or more of the cells; and a control unit configured to determine an operating point of the fuel cell and to cause the fuel cell to operate, and also configured to cause the fuel cell to operate at a low efficiency operating point having a lower efficiency than an efficiency of a reference operating point in a warm-up operation of the fuel cell. The control unit is configured to: calculate a total number of the cells in which the voltage detected by the voltage sensor is equal to or less than a predetermined first reference voltage; and calculate an exhaust hydrogen concentration based on the total number of the cells. According to the aspect above, the exhaust hydrogen concentration can be accurately estimated using the total number of the cells in which the cell voltage decreases.

The fuel cell system according to the aspect above may further include: a temperature sensor configured to detect a temperature of the fuel cell; and a storage device storing a map in which a correction coefficient is associated with a current temperature of the fuel cell for each start-up temperature of the fuel cell and a value of the correction coefficient becomes large as the start-up temperature becomes low. The control unit may be configured to: store the start-up temperature acquired from the temperature sensor at a start-up of the fuel cell; acquire, based on the map, the correction coefficient associated with the start-up temperature and the current temperature acquired from the temperature sensor; and calculate the exhaust hydrogen concentration based on a value obtained by multiplying the total number of the cells by the correction coefficient. According to the aspect above, the exhaust hydrogen concentration can be accurately estimated using the correction coefficient associated with the start-up temperature.

In the fuel cell system according to the aspect above, the control unit may be configured to execute hydrogen concentration reduction processing when the exhaust hydrogen concentration is higher than a predetermined reference concentration. According to the aspect above, when the exhaust hydrogen concentration that is accurately estimated is higher than the reference concentration, the exhaust hydrogen concentration can be reduced.

In the fuel cell system according to the aspect above, the voltage sensor may include a first voltage sensor configured to detect the voltage of one of the cells, and a second voltage sensor configured to detect the voltage of two of the cells. The control unit may be configured to: count the number of the cells having the voltage being equal to or less than the first reference voltage as one when the voltage detected by the first voltage sensor is equal to or less than the first reference voltage; count the number of the cells having the voltage being equal to or less than the first reference voltage as two when the voltage detected by the second voltage sensor is equal to or less than the first reference voltage; count the number of the cells having the voltage being equal to or less than the first reference voltage as one when the voltage detected by the second voltage sensor is larger than the first reference voltage and equal to or less than a predetermined second reference voltage that is larger than the first reference voltage; and calculate the total number of the cells. According to the aspect above, the total number of cells can be calculated even when one voltage sensor is provided for two cells.

According to one aspect of the present disclosure, a fuel cell system is provided. The fuel cell system includes a fuel cell in which cells are stacked; a voltage sensor configured to detect a voltage in unit of one or more of the cells; and a control unit configured to calculate, among the stacked cells, the number of specific cells in which the voltage detected by the voltage sensor is equal to or less than a predetermined first reference voltage, and cause the fuel cell to operate using the calculated number of the specific cells; and a storage device storing a reference map in which a required heat generation amount is associated with the number of the specific cells such that an exhaust hydrogen concentration is equal to or less than a reference concentration, and the required heat generation amount decreases as the number of the specific cells increases. The control unit is configured to: calculate the number of the specific cells based on the detected voltage; acquire the required heat generation amount associated with the calculated number of the specific cells based on the reference map; and cause the fuel cell to operate with the acquired required heat generation amount as a target value. According to the aspect above, the control of the fuel cell under which the exhaust hydrogen concentration becomes the reference concentration can be executed by setting the required heat generation amount associated with the calculated total number of the specific cells using the reference map that is defined in advance such that the exhaust hydrogen concentration becomes the reference concentration.

According to one aspect of the present disclosure, a fuel cell system is provided. The fuel cell system includes: a fuel cell in which cells are stacked; a voltage sensor configured to detect a voltage in unit of one or more of the cells; and a control unit configured to calculate, among the stacked cells, the number of specific cells in which the voltage detected by the voltage sensor is equal to or less than a predetermined first reference voltage, and cause the fuel cell to operate based on the calculated number of the specific cells; and a storage device storing a reference map in which a required current amount is associated with the number of the specific cells and the required current amount decreases as the number of the specific cells increases. The control unit is configured to: calculate the number of the specific cells based on the detected voltage; acquire the required current amount associated with the calculated number of the specific cells based on the reference map; and cause the fuel cell to operate with the acquired required current amount as a target value. According to the aspect above, the control of the fuel cell under which the exhaust hydrogen concentration becomes the reference concentration can be executed by setting the required current amount associated with the calculated total number of the specific cells using the reference map that is defined in advance such that the exhaust hydrogen concentration becomes the reference concentration.

According to another aspect of the present disclosure, a method of controlling a fuel cell system including a fuel cell in which cells are stacked and a voltage sensor that detects a voltage in unit of one or more of the cells is provided. The method includes: causing the fuel cell to operate at a low efficiency operating point having a lower efficiency than an efficiency of a reference operating point in a warm-up operation of the fuel cell; and calculating a total number of the cells in which the voltage detected by the voltage sensor is equal to or less than a predetermined first reference voltage, and calculating an exhaust hydrogen concentration based on the total number of the cells.

According to another aspect of the present disclosure, a method of controlling a fuel cell system including a fuel cell in which cells are stacked and a voltage sensor that detects a voltage in unit of one or more of the cells is provided. The method includes: calculating, among the stacked cells, the number of specific cells in which the voltage detected by the voltage sensor is equal to or less than a predetermined first reference voltage; and acquiring a required heat generation amount associated with the calculated number of the specific cells based on a reference map in which the required heat generation amount is associated with the number of the specific cells and the required heat generation amount decreases as the number of the specific cells increases, and causing the fuel cell to operate with the acquired required heat generation amount as a target value.

According to another aspect of the present disclosure, a method of controlling a fuel cell system including a fuel cell in which cells are stacked and a voltage sensor that detects a voltage in unit of one or more of the cells is provided. The method includes: calculating, among the stacked cells, the number of specific cells in which the voltage detected by the voltage sensor is equal to or less than a predetermined first reference voltage; and acquiring a required current amount associated with the calculated number of the specific cells based on a reference map in which the number of the specific cells is associated with the required current amount and the required current amount decreases as the number of the specific cells increases, and causing the fuel cell to operate with the acquired required current amount as a target value.

The present disclosure can be realized in various forms, and in addition to the fuel cell system, for example, the present disclosure can be realized in forms of a control method of the fuel cell system, a computer program for causing a computer to execute the control method, and a non-transitory recording medium storing the computer program.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

A. First Embodiment

Figure 1:
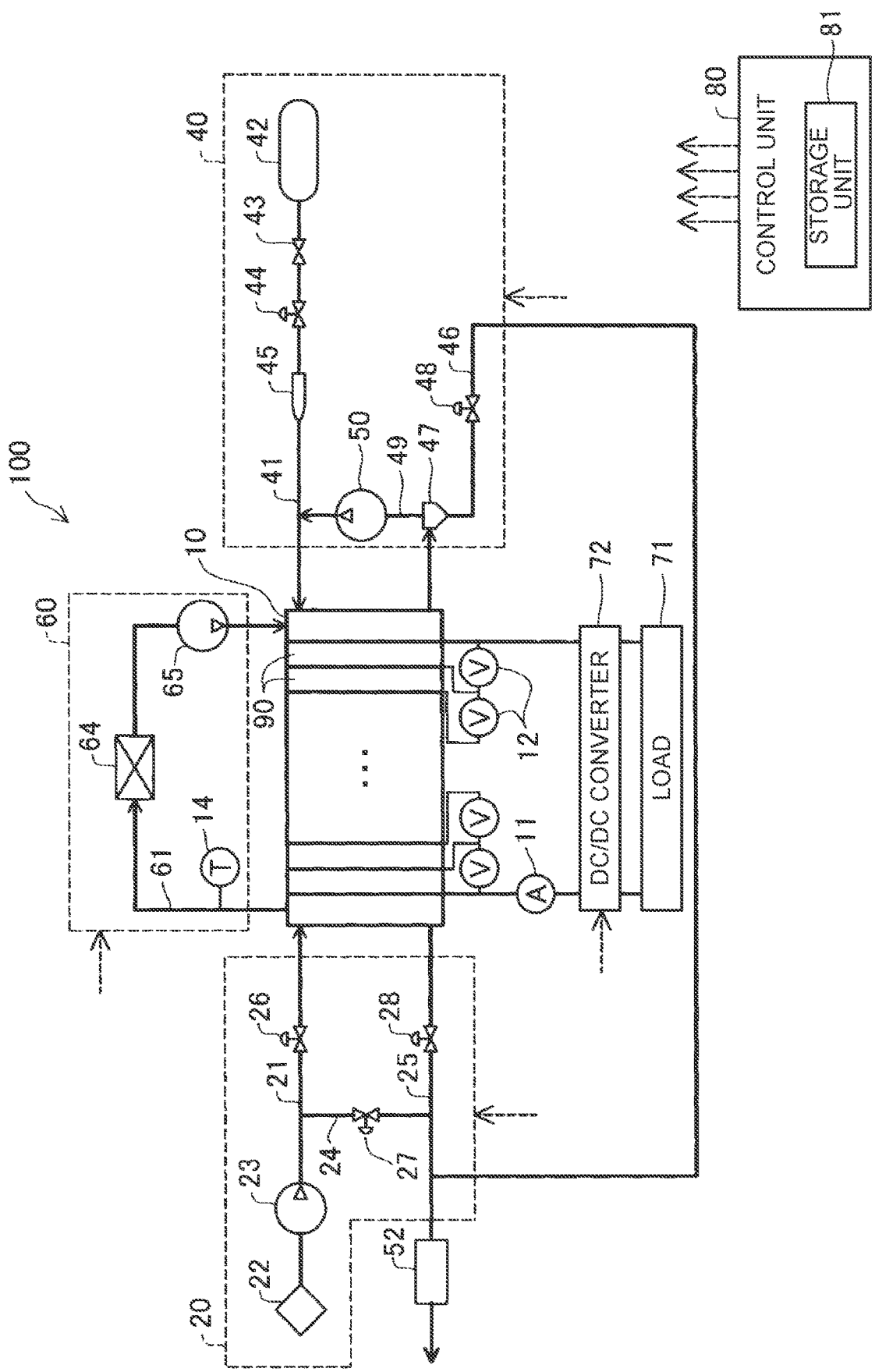
FIG. 1 is a diagram schematically showing a configuration of a fuel cell system mounted on a vehicle.

FIG. 1 is a diagram showing a schematic configuration of a fuel cell system 100 mounted on a vehicle. The fuel cell system 100 includes a fuel cell 10, an oxidizing gas system circuit 20, a fuel gas system circuit 40, a cooling system circuit 60, a load 71, a control unit 80, a current sensor 11, voltage sensors 12, a temperature sensor 14, and a muffler 52. The fuel cell 10 uses a fuel gas and an oxidizing gas to generate electricity through an electrochemical reaction. The fuel cell 10 has a stack structure in which a plurality of cells 90 is stacked. The cells 90 each include a structure in which a membrane electrode and gas diffusion layer assembly (MEGA) (not shown) is interposed between separators (not shown). The MEGA includes a gas diffusion layer (not shown) on each side of a membrane electrode assembly (MEA) (not shown). The MEA includes an electrode catalyst layer (not shown) that functions as an anode on one side of an electrolyte membrane (not shown), and an electrode catalyst layer (not shown) that functions as a cathode on the other side of the electrolyte membrane. In the first embodiment, hydrogen is used as the fuel gas, and oxygen in the air is used as the oxidizing gas. An electric power generated by the fuel cell 10 is boosted by the DC/DC converter 72, and then supplied to the load 71 and consumed by the load 71. The current sensor 11 is provided between the fuel cell 10 and the load 71. The current sensor 11 detects an output current of the fuel cell 10. In the first embodiment, the voltage sensor 12 that detects the voltage in unit of one cell 90 is provided. The control unit 80 includes a central processing unit (CPU) (not shown) and a storage device 81, and controls the oxidizing gas system circuit 20, the fuel gas system circuit 40, and the cooling system circuit 60. The storage device 81 stores a program for exhaust hydrogen determination processing to be described later, various types of maps such as a map that defines a first voltage threshold Vs1 to be used in the exhaust hydrogen determination processing, and values such as a total sensor number N. The voltage sensors 12, the current sensor 11, and the temperature sensor 14 are connected to the control unit 80. Detection values detected by the current sensor 11, the voltage sensors 12, and the temperature sensor 14 are transmitted to the control unit 80. Each of the voltage sensors 12 is assigned with a number starting with the voltage sensor 12 disposed at either of the cells 90 at the respective ends of the fuel cell 10 as 1. The control unit 80 receives a detection voltage from a voltage sensor 12 and specifies what number is the voltage sensor 12 that has transmitted the detection voltage. The control unit 80 controls the output voltage of the fuel cell 10 by controlling an output current of the fuel cell 10 using the DC/DC converter 72.

The oxidizing gas system circuit 20 is a circuit through which the air is supplied to the cathode of the fuel cell 10. The oxidizing gas system circuit 20 includes an oxidizing gas supply pipe 21, an air cleaner 22, an air compressor 23, a bypass pipe 24, an oxidizing off gas discharge pipe 25, an oxidizing gas supply valve 26, a bypass valve 27, and a cathode off gas exhaust valve 28. The oxidizing gas supply pipe 21 connects the air cleaner 22 and the cathode of the fuel cell 10, that is, an oxidizing gas inlet (not shown). The oxidizing off gas discharge pipe 25 connects an oxidizing off gas outlet (not shown) of the fuel cell 10 and the atmosphere. The muffler 52 is disposed in the oxidizing off gas discharge pipe 25. The air compressor 23 compresses the air from which dust has been removed by the air cleaner 22, and supplies the compressed air to the fuel cell 10 via the oxidizing gas supply pipe 21. The oxidizing gas supply valve 26 is disposed in the oxidizing gas supply pipe 21, and opens or closes a flow path of the oxidizing gas supply pipe 21 to cut off or allow supply of the air to the fuel cell 10. The cathode off gas exhaust valve 28 is disposed in the oxidizing off gas discharge pipe 25, controls an exhaust amount of the cathode off gas discharged from the oxidizing off gas outlet of the fuel cell 10, and adjusts a back pressure of the fuel cell 10. The bypass pipe 24 connects the oxidizing gas supply pipe 21 and the oxidizing off gas discharge pipe 25. The bypass valve 27 is disposed in the bypass pipe 24, and adjusts a flow rate of the air flowing through the fuel cell 10 in cooperation with the air compressor 23 and the cathode off gas exhaust valve 28.

The fuel gas system circuit 40 is a circuit that supplies the fuel gas to the anode of the fuel cell 10. The fuel gas system circuit 40 includes a fuel gas supply pipe 41, a fuel gas tank 42 serving as a fuel gas source, a main stop valve 43, a pressure regulating valve 44, an injector 45, a fuel exhaust gas pipe 46, and a gas-liquid separator 47, and an exhaust-drain valve 48, a reflux pipe 49, and a reflux pump 50. The fuel gas supply pipe 41 connects the fuel gas tank 42 and the anode of the fuel cell 10, that is, a fuel gas inlet (not shown). The fuel gas tank 42 stores a high-pressure hydrogen gas. In the fuel gas supply pipe 41, the main stop valve 43, the pressure regulating valve 44, and the injector 45 are sequentially disposed from the fuel gas tank 42 side toward the fuel cell 10 side. The main stop valve 43 opens or closes a flow path of the fuel gas supply pipe 41 to cut off or allow supply of the hydrogen gas from the fuel gas tank 42. The pressure regulating valve 44 reduces a pressure of the high-pressure hydrogen gas to a predetermined hydrogen pressure. The injector 45 is provided to adjust an amount of hydrogen gas to be supplied to the fuel cell 10. The injector 45 adjusts a supply amount of the fuel gas (fuel gas amount) by controlling an injection interval, that is, an opening interval. The fuel exhaust gas pipe 46 connects the fuel off gas outlet (not shown) of the fuel cell 10 and the oxidizing off gas discharge pipe 25. In the fuel exhaust gas pipe 46, the gas-liquid separator 47 and the exhaust-drain valve 48 are sequentially disposed from the fuel cell 10 side toward the muffler 52 side. The reflux pipe 49 connects the gas-liquid separator 47 and the fuel gas supply pipe 41 on the downstream side of the injector 45. The fuel off gas discharged from the fuel off gas outlet of the fuel cell 10 is separated into a gas component and a liquid component by the gas-liquid separator 47. The exhaust-drain valve 48 switches between a communication state and a non-communication state of the fuel exhaust gas pipe 46. The gas component of the fuel exhaust gas separated by the gas-liquid separator 47 is recirculated to the fuel gas supply pipe 41 by the reflux pump 50. With the configuration above, unreacted hydrogen contained in the fuel off gas is reused. When a concentration of gas components other than hydrogen gas in the fuel off gas becomes high, the exhaust-drain valve 48 is opened, and the liquid component and the fuel off gas are discharged. The fuel off gas flowing through the fuel exhaust gas pipe 46 and the cathode off gas flowing through the oxidizing off gas discharge pipe 25 are mixed and exhausted through the muffler 52.

The cooling system circuit 60 is a circuit for cooling the fuel cell 10. The cooling system circuit 60 includes a refrigerant supply pipe 61, a radiator 64, and a refrigerant pump 65. A refrigerant flowing through the refrigerant supply pipe 61 is cooled by the radiator 64 and circulated in the fuel cell 10 by the refrigerant pump 65. The temperature sensor 14 is provided in the refrigerant supply pipe 61. The temperature of the refrigerant discharged from the fuel cell 10 and the temperature of the fuel cell 10 are substantially equal to each other. Therefore, the temperature of the refrigerant can be the temperature of the fuel cell 10. Note that, the temperature sensor may be provided in the fuel cell 10.

A normal operation and a warm-up operation of the fuel cell 10 will be described. In the normal operation, the air is supplied in an amount equal to or more than a theoretical amount of the air required to generate a target output power, whereby the power is generated. On the other hand, in the warm-up operation, the power is generated using an amount of air that is less than the amount of air supplied in the normal operation in order to reduce an operation efficiency. Here, an operating point of the fuel cell 10 when the power is generated using the amount of air that is less than the amount of air supplied in the normal operation is an operating point that is controlled in the warm-up operation. That operating point is referred to a low efficiency operating point. In the warm-up operation, an air stoichiometric ratio that is a ratio of the amount of air that is actually supplied to the theoretical amount of air required to generate the target output power is, for example, about 1.0. The fuel cell 30 is caused to operate at the low efficiency operating point to increase a concentration overvoltage such that the fuel cell 10 is warmed up through self-heating. In the normal operation, the control unit 80 determines the operating point of the fuel cell 10 and causes the fuel cell 10 to operate such that an appropriate operating efficiency is achieved from the viewpoint of fuel consumption. The operating efficiency is the efficiency obtained based on the amount of fuel gas supplied to the fuel cell 10 and the electric power output from the fuel cell 10. In the warm-up operation, the fuel cell 10 is operated at the low efficiency operating point having a lower efficiency than that of a reference operating point that serves as a reference among the operating points of the fuel cell 10. Here, the reference operating point is an operating point at which the fuel cell 10 is operated with the supply of air in the amount equal to or more than the theoretical amount of air required to generate the target output power. In the warm-up operation, for example, a target heat generation amount is set in accordance with a start-up temperature of the fuel cell 10, and a target value of the low efficiency operating point is determined based on the set target heat generation amount.

The warm-up operation is performed mainly when an outside air temperature is below the freezing point. Below the freezing point, water, etc. that remains in the fuel cell 10 may freeze, and the flow path of the oxidizing gas of the fuel cell 10 may be blocked. Therefore, a pressure loss of the oxidizing gas increases, and the actual supply amount of the fuel gas decreases with respect to the target supply amount of the fuel gas. Accordingly, an actual cell voltage decreases with respect to the target cell voltage. In addition, pumping hydrogen is generated when the supply amount of the fuel gas decreases. The pumping hydrogen is hydrogen generated when hydrogen ions that have been moved to the cathode receive electrons. An amount of hydrogen ions moved to the cathode is proportional to an amount of current swept from the fuel cell 10. Therefore, the amount of generated pumping hydrogen is proportional to the amount of swept current.

Figure 2:
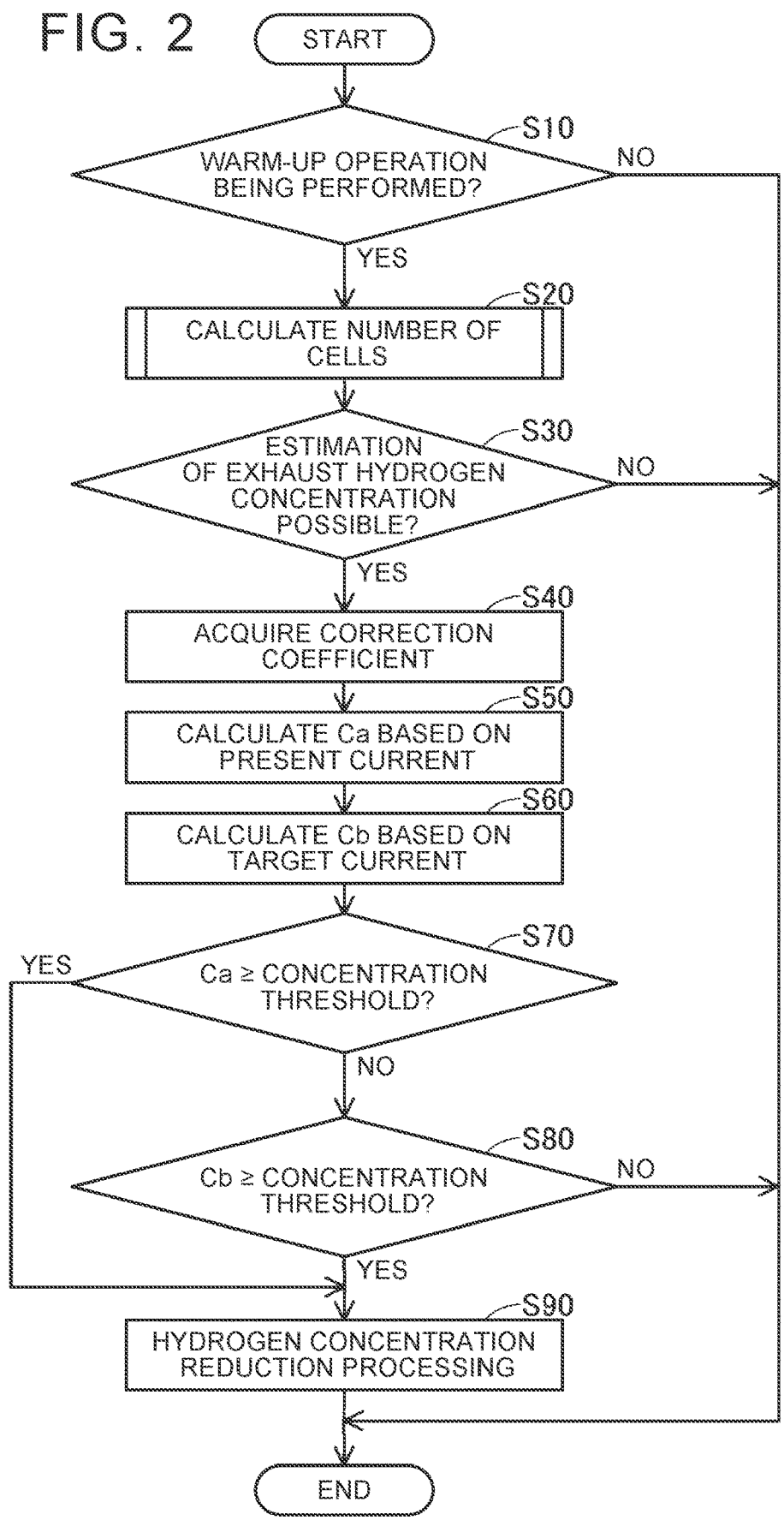
FIG. 2 is a flow chart of exhaust hydrogen determination processing according to a first embodiment.

The exhaust hydrogen determination processing executed by the control unit 80 will be described with reference to FIG. 2. After the start-up, the control unit 80 repeatedly executes the exhaust hydrogen determination processing. The control unit 80 stores, in the storage device 81, the temperature detected by the temperature sensor 14 at the time of start-up as a start-up temperature at the start-up of the fuel cell 10. The control unit 80 determines whether the warm-up operation is required, for example, based on a detection value of a temperature sensor (not shown) that detects the outside air temperature and that is provided in the oxidizing gas supply pipe 21 (FIG. 1). When the control unit 80 determines that the warm-up operation is required, the control unit 80 switches a warm-up operation flag to ON and causes the warm-up operation to be started. Specifically, the control unit 80 causes the oxidizing gas system circuit 20 to start supply of the air to the fuel cell 10, causes the fuel gas system circuit 40 to start the supply of fuel gas to the fuel cell 10, and causes the fuel cell 10 to start power generation. Moreover, the control unit 80 switches the warm-up operation flag to OFF to terminate the warm-up operation. The control unit 80 causes the fuel cell 10 to operate at the low efficiency operating point during the warm-up operation.

When the exhaust hydrogen determination processing is started, the control unit 80 determines whether the fuel cell 10 is in the warm-up operation (step S10). With reference to the warm-up operation flag, when the warm-up operation flag is OFF, the control unit 80 determines that the fuel cell 10 is not in the warm-up operation (step S10: NO), and terminates this processing routine. When the warm-up operation flag is ON (step S10: YES), the control unit 80 executes cell number calculation processing (step S20).

Figure 3:
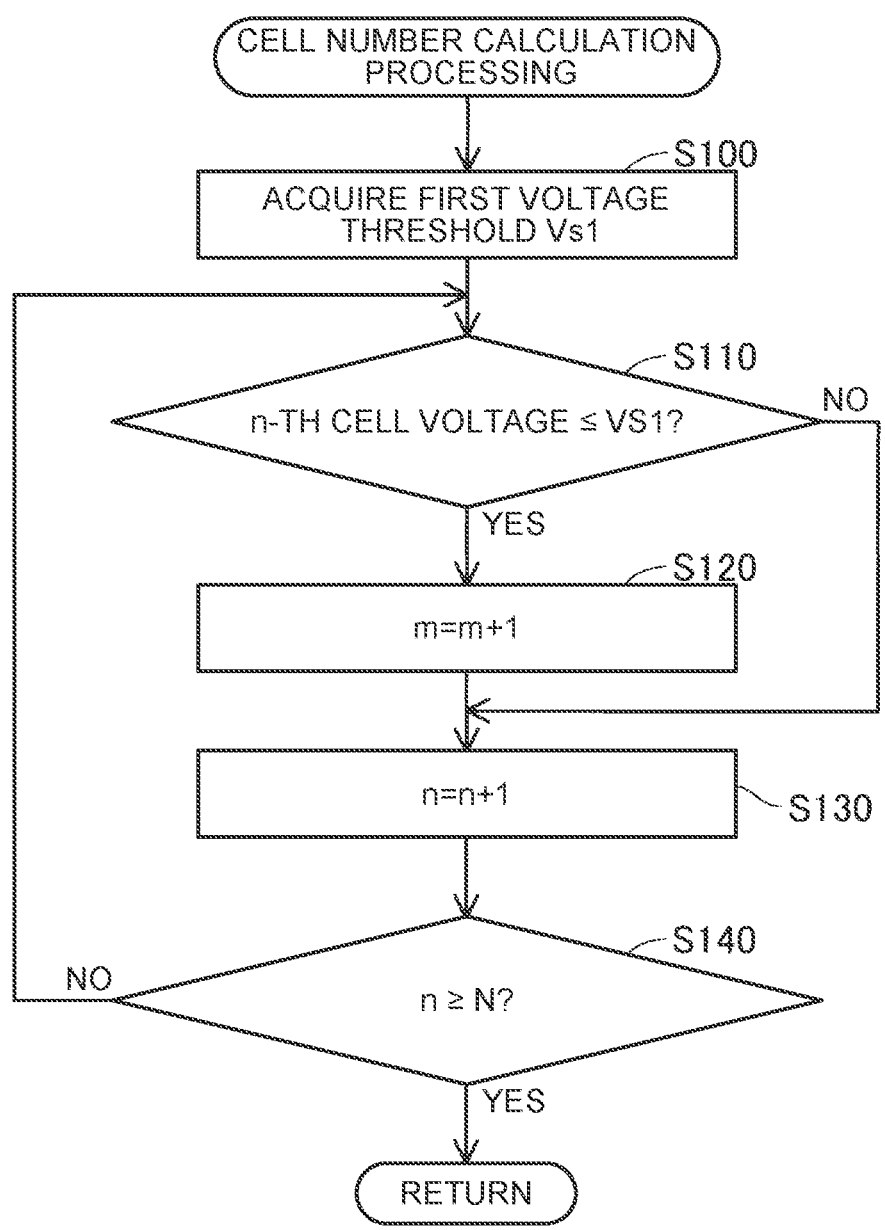
FIG. 3 is a flowchart of cell number calculation processing according to the first embodiment.

The cell number calculation processing will be described with reference to FIG. 3. The inventors have focused that the amount of generated pumping hydrogen increases as the number of cells 90 in which the cell voltage drops increases. In order to calculate the amount of generated pumping hydrogen, the number of cells 90 that is estimated to generate the pumping hydrogen (hereinafter referred to as a "pumping hydrogen cell number") Nh is counted in the cell number calculation processing. In the cell number calculation processing, the control unit 80 determines that the pumping hydrogen is generated in the cell 90 having the cell voltage equal to or lower than the first voltage threshold Vs1, and specifies the cell 90 as the cell 90 that is estimated to generate the pumping hydrogen (hereinafter referred to as a "pumping hydrogen generation cell").

Figure 4:
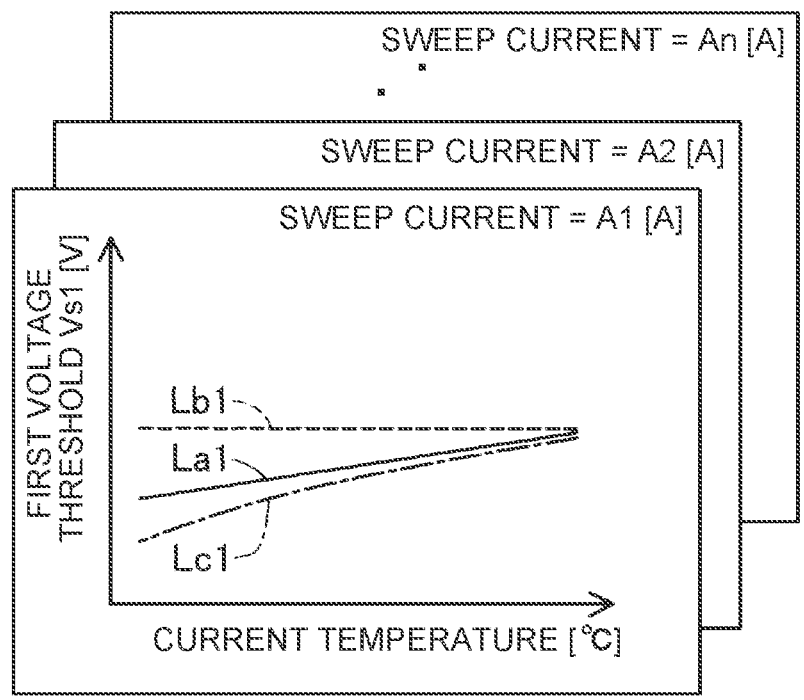
FIG. 4 is a diagram showing a relationship between a current temperature for each sweep current and a first voltage threshold.

FIG. 4 is a map that defines the first voltage threshold Vs1 for a current temperature and a sweep current. Here, the sweep current is a current extracted from the fuel cell 10 by the DC/DC converter 72. The horizontal axis in FIG. 4 indicates the current temperature [° C.] of the fuel cell 10, and the vertical axis indicates the first voltage threshold Vs1 [V]. The first voltage threshold Vs1 is defined for each sweep current. The output voltage of the fuel cell 10 decreases as the output current increases. Therefore, the first voltage threshold Vs1 is set smaller as the sweep current of the fuel cell 10 increases. A characteristic line Lb1 is a characteristic line in which the first voltage threshold Vs1 is set to be constant regardless of the current temperature of the fuel cell 10. As the temperature of the fuel cell 10 decreases, the resistance of the electrolyte membrane increases, and the cell voltage output from the cell 90 decreases. Therefore, as shown by characteristic lines La1, Lc1 characteristic lines reflecting the characteristics of the fuel cell 10 in which the cell voltage decreases as the current temperature decreases may be used. In the first embodiment the characteristic line La1 is used.

When the control unit 80 starts the cell number calculation processing (FIG. 3), the control unit 80 sets a sensor number n indicating the number of the voltage sensor 12 used in this subroutine to an initial value of 1, and a generation cell number m that indicates the total number of the cells 90 in which the pumping hydrogen is generated is set to an initial value of zero. The control unit 80 acquires the first voltage threshold Vs1 (an example of the first reference voltage) corresponding to the current temperature detected by the temperature sensor 14 and the sweep current with the target current as the sweep current, with reference to the map as shown in FIG. 4 (step S100). The control unit 80 determines whether the detection voltage detected by the n-th voltage sensor 12 is the first voltage threshold Vs1 or less (step S110). When the control unit 80 determines that the detection voltage is equal to or lower than the first voltage threshold Vs1 (step S110: YES), the control unit 80 estimates that the pumping hydrogen is generated in the target cell and adds 1 to the generation cell number m (step S120). The process then proceeds to step S130. When the control unit 80 determines that the detection voltage is not equal to or lower than the first voltage threshold Vs1, that is, is higher than the first voltage threshold Vs1 (step S110: NO), the control unit 80 estimates that pumping hydrogen is not generated in the target cell, and skips step S120. The process then proceeds to step S130. The control unit 80 adds 1 to the sensor number n (step S130) such that the next voltage sensor 12 is subjected to determination, and determines whether the sensor number n is equal to or larger than the total sensor number N of the voltage sensors 12 (step S140). When the control unit 80 determines that the sensor number n is not equal to or larger than the total sensor number N, that is, is less than the total sensor number N (step S140: NO), the control unit 80 returns to step S110 to make a determination regarding the next voltage sensor 12. When the control unit 80 determines that the sensor number n is equal to or larger than the total sensor number N (step S140: YES), the control unit 80 completes the determination for all of the voltage sensors 12, and thus terminates the subroutine.

Returning to FIG. 2, after execution of step S20, the control unit 80 determines whether the exhaust hydrogen concentration can be estimated (step S30). Specifically, the control unit 80 determines whether each value, such as a total air flow rate Va used in Equations (1) to (3) that are equations for calculating the exhaust hydrogen concentration to be described below, is appropriate. Examples of the conditions are as shown in (a) to (j). At least one of the items (a) to (j) is used as a criterion. When at least one of the one or more criteria used is applicable, the control unit 80 determines that the exhaust hydrogen concentration cannot be estimated.
(a) When the absolute value of the cell voltage is the reference value or less;
(b) When the cell voltage is a command voltage value or less;
(c) When the cell voltage does not change within a predetermined range with respect to the command voltage value;
(d) When the current temperature is below the reference value;
(e) When the absolute value of the air flow rate is below the reference value;
(f) When the air flow rate is the command flow rate value or less;
(g) When the air flow rate does not change within the predetermined range with respect to the command flow rate value;
(h) When the absolute value of the output current is the reference value or less;
(i) When the output current is the command current value or less; and
(j) When the output current does not change within a predetermined range with respect to the command current value.

The air flow rate is, for example, a value estimated based on a rotation speed of the air compressor 23 and an opening degree of the bypass valve 27. When the control unit 80 determines that the exhaust hydrogen concentration cannot be estimated (step S30: NO), the control unit 80 terminates the processing routine. When the control unit 80 determines that the exhaust hydrogen concentration can be estimated (step S30: YES), the process proceeds to step S40.

Here, equations for calculating the exhaust hydrogen concentration Ch that is used in subsequent steps S30 and S60 will be described. The inventors have focused that the pumping hydrogen generation amount is proportional to the pumping hydrogen cell number and the current swept from the fuel cell 10. On assumption that current having the same current value flows in each of the cells 90, the exhaust hydrogen concentration Ch is calculated using Equations (1) to (3) as shown below.

$$Vh = CF \times I/(2 \times F) \times 22.4 \times 60 \times Nh \quad \text{Equation (1)}$$

$$Vo = I/(4 \times F) \times 22.4 \times 60 \times (Na - Nh) \quad \text{Equation (2)}$$

$$Ch = Vh/(Va - Vo + Vh) \times 100 \quad \text{Equation (3)}$$

Equation (1) is an equation for calculating the estimated generation amount of pumping hydrogen (hereinafter referred to as "pumping hydrogen amount"). Equation (2) is an equation for calculating an oxygen consumption amount. Equation (3) is an equation for calculating the exhaust hydrogen concentration Ch. A pumping hydrogen amount Vh and an oxygen consumption amount Vo calculated using Equations (1) and (2) are substituted in Equation (3). The definitions of parameters in Equations (1) to (3) are as follows.
Vh: Pumping hydrogen amount [NL/min]
Vo: Oxygen consumption [NL/min]
Ch: Exhaust hydrogen concentration [%]
Va: Total air flow rate [NL/min]
CF: Correction coefficient
I: Sweep current [A]
Nh: Pumping hydrogen cell number
Na: Total cell number
F: Faraday constant The "total cell number" indicates the total number of the cells 90. The numerical value "2" in Equation (1) is the number of electrons received from the cathode when two hydrogen ions are turned into one hydrogen molecule at the cathode. The numerical value "4" in Equation (2) is the number of electrons received from the cathode when one oxygen molecule is turned into water at the cathode. The amount of charge per second that is supplied to the cathode is estimated based on the sweep current I. For example, in the calculation of the pumping hydrogen amount Vh in Equation (1), the number of molecules of pumping hydrogen to be generated is calculated based on the estimated amount of charge using the Faraday constant. The calculated number of molecules is converted to the pumping hydrogen amount Vh [NL/min] that is a volume of the pumping hydrogen generated per minute, using the volume per mol of gas (22.4 [L/mol]) in the standard state.

The correction coefficient CF in Equation (1) is a coefficient for correcting the theoretical value of the pumping hydrogen generation amount that is derived from the sweep current I and the pumping hydrogen cell number Nh to the actual measurement value, and is a value that is obtained through experiments, etc.

As described above, in the cell number calculation processing (FIG. 3), the cell 90 having the cell voltage being the first voltage threshold Vs1 or less is determined as the pumping hydrogen generation cell. When making the determination, it is ideal that the cell voltage can be clearly divided into two, that is, the cell voltage for the pumping hydrogen generation cell and the cell voltage for the cell 90 in which the pumping hydrogen is not generated (hereinafter referred to as "pumping hydrogen non-generation cell"). However, in reality, the measured values of the cell voltage are distributed from around 0 V to near the target cell voltage. Therefore, depending on the value of the first voltage threshold Vs1, there may be cases where the cell 90 in which the pumping hydrogen is not actually generated is erroneously counted as the pumping hydrogen generation cell, and the cell 90 in which the pumping hydrogen is actually generated is erroneously counted as the pumping hydrogen non-generation cell. The correction coefficient CF is used to correct such an erroneous count.

Figure 5:
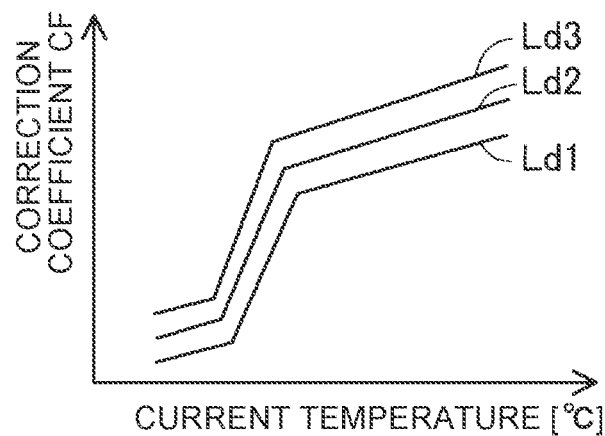
FIG. 5 is a diagram showing a relationship between the current temperature and a correction coefficient.

FIG. 5 is a map that defines the correction coefficient CF with respect to the current temperature for each start-up temperature. The horizontal axis of FIG. 5 indicates the current temperature [° C.] of the fuel cell 10, and the vertical axis indicates the correction coefficient CF. Characteristic lines Ld1 to Ld3 correspond to different start-up temperatures, and the start-up temperature becomes lower in the order of the characteristic line Ld1, the characteristic line Ld2, and the characteristic line Ld3. The start-up temperature will be described later.

The erroneous counting in which the cell 90 in which the pumping hydrogen is actually generated is counted as the pumping hydrogen non-generation cell is more likely to occur when the temperature of the fuel cell 10 that has been below the freezing point rises to the freezing point or above. In the warm-up operation, the fuel cell 10 is operated in an operation range in which the change amount of the output voltage with respect to the change amount of the air stoichiometric ratio is large. In the warm-up operation, when the supply amount of the fuel gas increases in response to, for example, melting of the frozen water in the fuel cell 10, the cell voltage significantly increases. Therefore, the measured value becomes larger than the first voltage threshold Vs1 despite that the pumping hydrogen is generated, and the cell 90 in which the pumping hydrogen is generated is erroneously counted as the pumping hydrogen non-generation cell.

Figure 6:
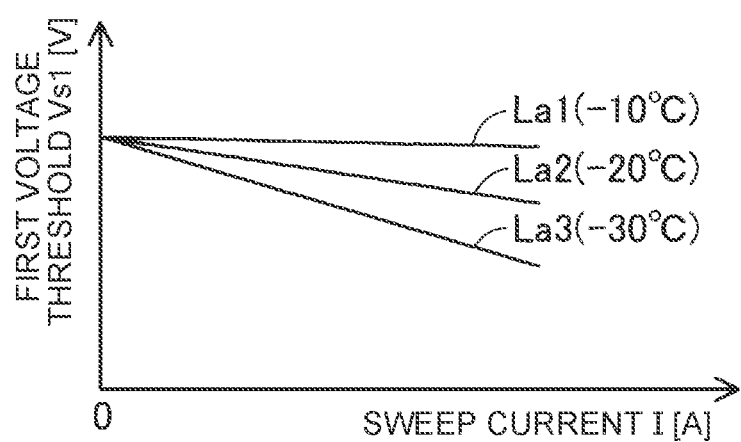
FIG. 6 is a diagram showing a relationship between the sweep current and the first voltage threshold.

On the contrary, the erroneous counting in which the cell 90 in which the pumping hydrogen is not actually generated is counted as the pumping hydrogen generation cell is more likely to occur in a range in proximity to the sweep current 0 A where the change amount of the output voltage with respect to the change amount of the temperature of the fuel cell 10 is small. FIG. 6 is a diagram showing the relationship between the sweep current I for each current temperature and the first voltage threshold Vs1. The horizontal axis of FIG. 6 indicates the sweep current I [A], and the vertical axis indicates the first voltage threshold Vs1 [V]. The characteristic lines La1 to La3 correspond to current temperatures of −10° C., −20° C., and −30° C., respectively. The change amount of the output voltage with respect to the change amount of the temperature of the fuel cell 10 is small in the vicinity to the sweep current 0 A. Therefore, even a slight detection error is likely to cause the erroneous counting. For example, when the temperature of the target cell 90 is lower than the temperature detected by the temperature sensor 14, the determination is made using the first voltage threshold Vs1 corresponding to the current temperature that is higher than the actual current temperature. In this case, the cell 90 in which the pumping hydrogen is not generated is erroneously counted as the pumping hydrogen generation cell.

When the cell 90 in which the pumping hydrogen is generated is erroneously counted as the pumping hydrogen non-generation cell, it is necessary to correct the counted number of cells to a large value. On the contrary, when the cell 90 in which the pumping hydrogen is not generated is erroneously counted as the pumping hydrogen generation cell, it is necessary to correct the counted number of cells to a small value. The correction coefficient CF is set in consideration of the above phenomenon.

Next, the reason for defining the map of the correction coefficient CF for each start-up temperature will be described. The inventors have found that, even when the operating point is the same at present, the pumping hydrogen is more likely to be generated as the start-up temperature becomes lower. This is because as the start-up temperature becomes lower, the amount of heat required for warming up is larger, and the command voltage is lowered, that is, the air supply amount is reduced. Therefore, the map in which the correction coefficient CF is increased as the start-up temperature is lower is used such that the pumping hydrogen amount can be accurately calculated.

Returning to FIG. 2, when the control unit 80 determines that the exhaust hydrogen concentration can be estimated (step S30: YES), the control unit 80 acquires the correction coefficient CF corresponding to the current temperature and the start-up temperature that are detected by the temperature sensor 14 with reference to the map as shown in FIG. 5 (step S40). The control unit 80 calculates the exhaust hydrogen concentration Ch based on Equations (1) to (3) above by substituting a present current that is the current detected by the current sensor 11 for the sweep current I, and substituting the value of the generation cell number m for the pumping hydrogen cell number Nh (step S50). The exhaust hydrogen concentration Ch calculated by substituting the present current is referred to as a first estimated hydrogen concentration Ca. The control unit 80 calculates the exhaust hydrogen concentration Ch based on Equations (1) to (3) above by substituting the target current for the sweep current I (step S60). The exhaust hydrogen concentration Ch calculated by substituting the target current is referred to as a second estimated hydrogen concentration Cb. The control unit 80 controls the sweep current to be the target current. However, for example, when the water remaining in the fuel cell 10 is not completely melted, there may be a case where the sweep current does not match the target current. The first estimated hydrogen concentration Ca and the second estimated hydrogen concentration Cb may deviate from each other. Therefore, both the first estimated hydrogen concentration Ca and the second estimated hydrogen concentration Cb are calculated, and the concentration determinations (steps S70, S80) are performed based on the respective hydrogen concentrations such that hydrogen concentration reduction processing can be executed without fail when the exhaust hydrogen concentration is high (step S90).

The control unit 80 determines whether the first estimated hydrogen concentration Ca is, for example, equal to or larger than a concentration threshold (an example of a reference concentration) based on an environmental standard (step S70). When the control unit 80 determines that the first estimated hydrogen concentration Ca is equal to or larger than the concentration threshold value (step S70: YES), the process proceeds to step S90 to reduce the exhaust hydrogen concentration. When the control unit 80 determines that the first estimated hydrogen concentration Ca is not equal to or larger than the concentration threshold, that is, is less than the concentration threshold (step S70: NO), the control unit 80 determines whether the second estimated hydrogen concentration Cb is equal to or larger than the concentration threshold (step S80). When the control unit 80 determines that the second estimated hydrogen concentration Cb is equal to or larger than the concentration threshold value (step S80: YES), the process proceeds to step S90 to reduce the exhaust hydrogen concentration. When the control unit 80 determines that the second estimated hydrogen concentration Cb is not equal to or larger than the concentration threshold value, that is, is less than the concentration threshold value (step S80: NO), this processing routine ends. The control unit 80 executes the hydrogen concentration reduction processing of changing the operating point of the fuel cell 10 to a high efficiency operating point having a higher efficiency than that of the current operating point in order to reduce the generation of pumping hydrogen (step S90). This processing routine then ends. The hydrogen concentration reduction processing may be any processing as long as the hydrogen concentration can be reduced. For example, the hydrogen concentration reduction processing is processing to reduce the target current value to be smaller than the present set value. With the processing above, the exhaust hydrogen concentration is reduced.

According to the exhaust hydrogen determination processing described above, the pumping hydrogen generation cell is specified based on the detection voltage detected by the voltage sensor 12, and the exhaust hydrogen concentration Ch is calculated based on the pumping hydrogen cell number Nh, which makes it possible to accurately calculate the exhaust hydrogen concentration Ch. The hydrogen concentration reduction processing is executed when the exhaust hydrogen concentration Ch is equal to or larger than the concentration threshold value. It is possible to use the exhaust hydrogen concentration Ch that has been accurately calculated to determine whether to execute the hydrogen concentration reduction processing. Therefore, execution of the hydrogen concentration reduction processing is suppressed when the actual exhaust hydrogen concentration is not equal to or larger than the concentration threshold value. When the exhaust hydrogen concentration Ch is equal to or larger than the concentration threshold value, the operating point is moved to the high efficiency side. Therefore, when the calculation accuracy of the exhaust hydrogen concentration Ch is poor, excessive movement (hunting) of the operating point occurs. Excessive movement (hunting) of the operating point can be suppressed by accurately calculating the exhaust hydrogen concentration Ch. Further, since the hydrogen concentration reduction processing is executed during the warm-up operation, it is possible to suppress an increase in the pumping hydrogen amount due to an increase in the sweep current after shifting to the normal operation. The inventors have found that once the pumping hydrogen is generated, the catalyst surface of the electrode catalyst layer functioning as the cathode is turned into a hydrogen-rich state, oxygen supply to the catalyst surface is inhibited, and power generation reaction is inhibited. When the catalyst surface is in a hydrogen-rich state and the operation is shifted to the normal operation, the sweep current of the fuel cell 10 is increased, and the pumping hydrogen amount is also increased in accordance with the increase of the sweep current. On the basis of the above, an increase in the pumping hydrogen amount can be suppressed by executing the hydrogen concentration reduction processing during the warm-up operation before shifting to the normal operation.

B: Second Embodiment

In the first embodiment, the fuel cell system 100 includes the voltage sensors 12 that each detect the voltage in unit of one cell 90. On the other hand, in a fuel cell system according to a second embodiment, the plurality of cells 90 at respective ends among the stacked cells 90 are provided with the voltage sensors 12 that each detect the voltage in unit of one cell 90 (hereinafter referred to as "first voltage sensors"). The voltage sensors 12 (hereinafter referred to as "second voltage sensors") that each detect the voltage in unit of two cells 90 are provided for the intermediate cells 90 excluding the plurality of cells 90 at both ends. The detection voltage detected by the voltage sensor 12 that detects the voltages of the two cells 90 is the sum of the voltages of the two cells 90. Cell number calculation processing according to the second embodiment is processing that enables specification of the pumping hydrogen generation cell even in the configuration in which the voltage sensor 12 detects the voltages of two cells 90. The exhaust hydrogen determination processing according to the second embodiment is the same as the exhaust hydrogen determination process according to the first embodiment except for the pumping hydrogen generation cell number calculation processing, and therefore description thereof will be omitted.

Figure 8:
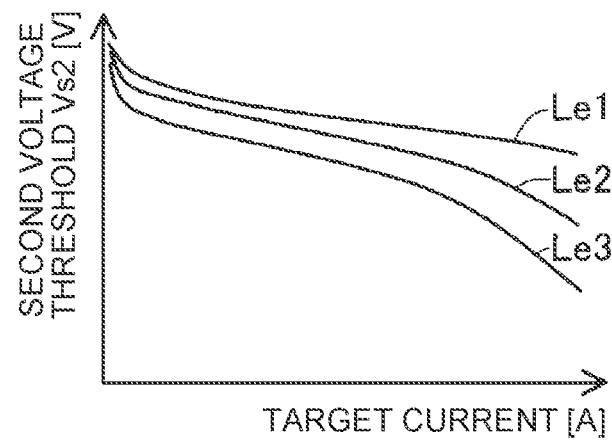
FIG. 8 is a diagram showing a relationship between a target current and a second voltage threshold according to the second embodiment.

When the cell voltage of only one of the two cells 90 to be detected by the second voltage sensor is low, the detection voltage detected by the second voltage sensor takes the value between the detection voltage when neither of the cell voltages of two cells 90 does not drop and the detection voltage when both of the cell voltages of the two cells 90 drop. Therefore, the second voltage sensor Vs2, which is larger than the first voltage threshold Vs1, is used to specify the second voltage sensor that detects the cell voltages of two cells 90, either of the two cells 90 having a decreased cell voltage. FIG. 8 is a map that defines the second voltage threshold Vs2 with respect to the target current for each current temperature. The horizontal axis of FIG. 8 indicates the target current [A], and the vertical axis indicates the second voltage threshold Vs2. Characteristic lines Le1 to Le3 correspond to different current temperatures, and the current temperature becomes lower in the order of the characteristic line Le1, the characteristic line Le2, and the characteristic line Le3. The cell voltage of the cell 90 in which the pumping hydrogen is not generated has a value corresponding to the target voltage of the fuel cell 10. Therefore, the second voltage threshold Vs2 is set to a value corresponding to the target voltage. In the cell number calculation processing according to the second embodiment, when the detection voltage detected by the second voltage sensor is higher than the first voltage threshold Vs1 and is equal to or less than the second voltage threshold value Vs2, the number of the pumping hydrogen generation cell is counted as one.

Figure 7:
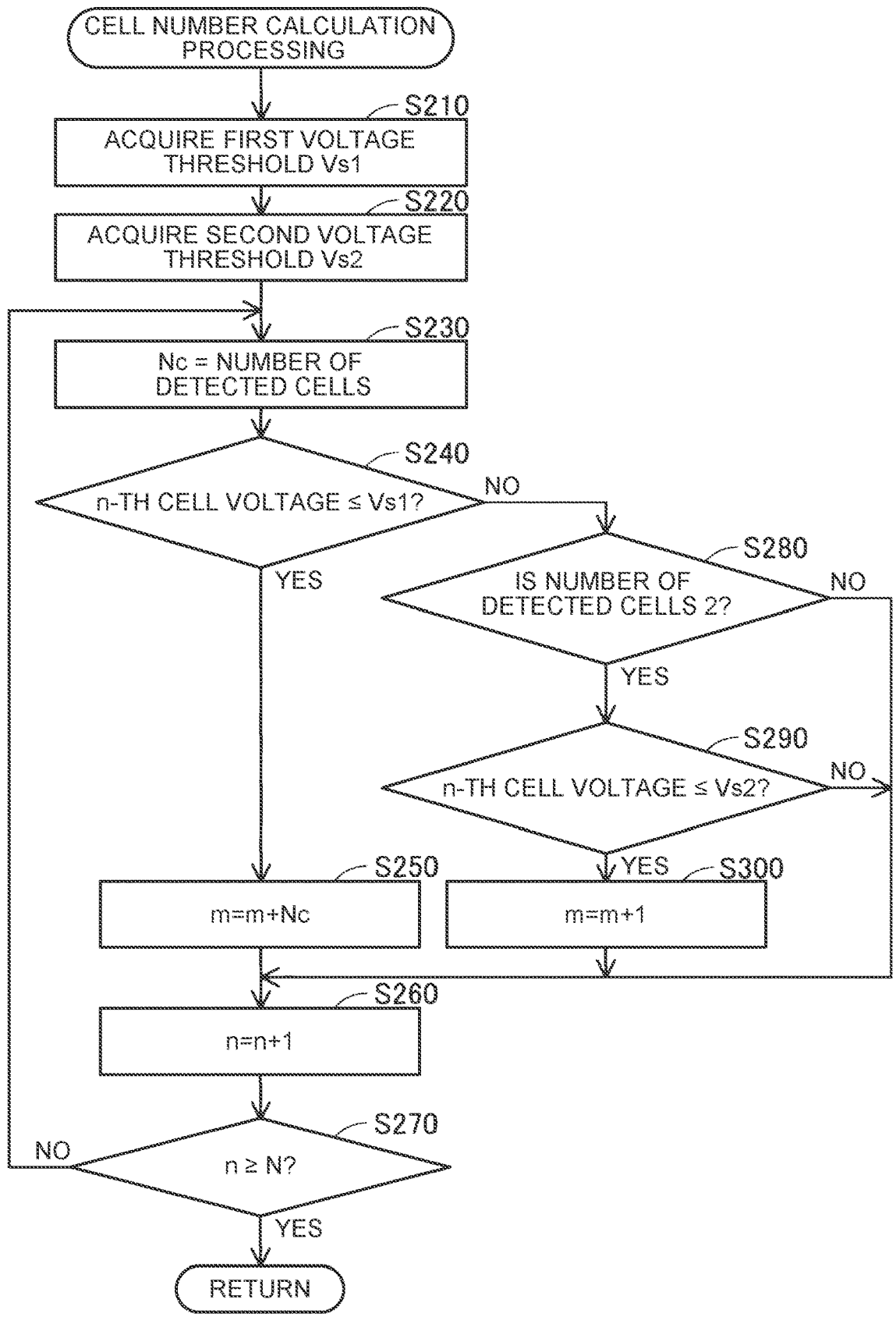
FIG. 7 is a flowchart of cell number calculation processing according to a second embodiment.

When the control unit 80 starts the cell number calculation processing (FIG. 7), the sensor number n that is a variable used in this subroutine is set to an initial value of 1, and the generation cell number m is set to an initial value of 0, as in the first embodiment. The control unit 80 acquires the first voltage threshold Vs1 corresponding to the current temperature and the detection current detected by the current sensor 11 with reference to the map shown in FIG. 6 (step S210). The control unit 80 acquires the second voltage threshold Vs2 (an example of the second reference voltage) corresponding to the current temperature and the target current with reference to the map shown in FIG. 8 (step S220).

The control unit 80 sets the number of cells 90 that is detected by the target n-th voltage sensor 12 to a cell number Nc (step S230). When the cell number is detected by the first voltage sensor, the cell number Nc is set to 1. When the cell number is detected by the second voltage sensor, the cell number Nc is set to 2. The control unit 80 determines whether the detection voltage detected by the target n-th voltage sensor 12 is equal to or less than the first voltage threshold Vs1 (step S240). When the control unit 80 determines that the detection voltage is equal to or less than the first voltage threshold Vs1 (step S240: YES), the control unit 80 estimates that the pumping hydrogen is generated in the target cell. Therefore, the control unit 80 adds the cell number Nc to the generation cell number m (step S250), and the process proceeds to step S260. In the case of the first voltage sensor, 1 is added to the generation cell number m. In the case of the second voltage sensor, 2 is added to the generation cell number m.

When the control unit 80 determines that the detection voltage is not equal to or less than the first voltage threshold Vs1, that is, is higher than the first voltage threshold Vs1 (step S240: NO), the control unit 80 determines whether the number of cells 90 detected by the target voltage sensor 12 is two (step S280). When the control unit 80 determines that the target voltage sensor 12 is the first voltage sensor and the number of detected cells is not two (step S280: NO), the process proceeds to step S260. When the control unit 80 determines that the number of detected cells is two (step S280: YES), the control unit 80 determines whether the target n-th detection voltage is equal to or less than the second voltage threshold Vs2 (step S290). When the control unit 80 determines that the detection voltage is not equal to or less than the second voltage threshold Vs2, that is, is higher than the second voltage threshold Vs2 (step S290: NO), the process to step S260. When the control unit 80 determines that the detection voltage is equal to or less than the second voltage threshold Vs2 (step S290: YES), the control unit 80 adds 1 to the generation cell number m (step S300).

The control unit 80 adds 1 to the sensor number n (step S260) such that the next voltage sensor 12 is subjected to determination, and determines whether the sensor number n is equal to or larger than the total sensor number N of the voltage sensors 12 (step S270). When the control unit 80 determines that the sensor number n is not equal to or larger than the total sensor number N, that is, is less than the total sensor number N (step S270: NO), the control unit 80 returns to step S230 to make the determination regarding the next voltage sensor 12. When the control unit 80 determines that the sensor number n is equal to or larger than the total sensor number N (step S270: YES), the control unit 80 completes the determination for all of the voltage sensors 12, and thus terminates the subroutine.

As described above, according to the cell number calculation processing according to the second embodiment, also in the case where the voltage sensors 12 includes the voltage sensor that detects the voltage in unit of one cell 90 and the voltage sensor that detects the voltage in unit of two cells 90, the pumping hydrogen cell number Nh can be calculated accurately.

C. Third Embodiment

In a third embodiment, the fuel cell 10 is controlled at the operating point at which the exhaust hydrogen concentration Ch becomes equal to or less than the reference concentration with use of the reference map that is defined in advance such that the exhaust hydrogen concentration Ch becomes equal to or less than the reference concentration. Consequently, the exhaust hydrogen concentration Ch of the fuel cell 10 can be maintained below the reference concentration.

Figure 9:
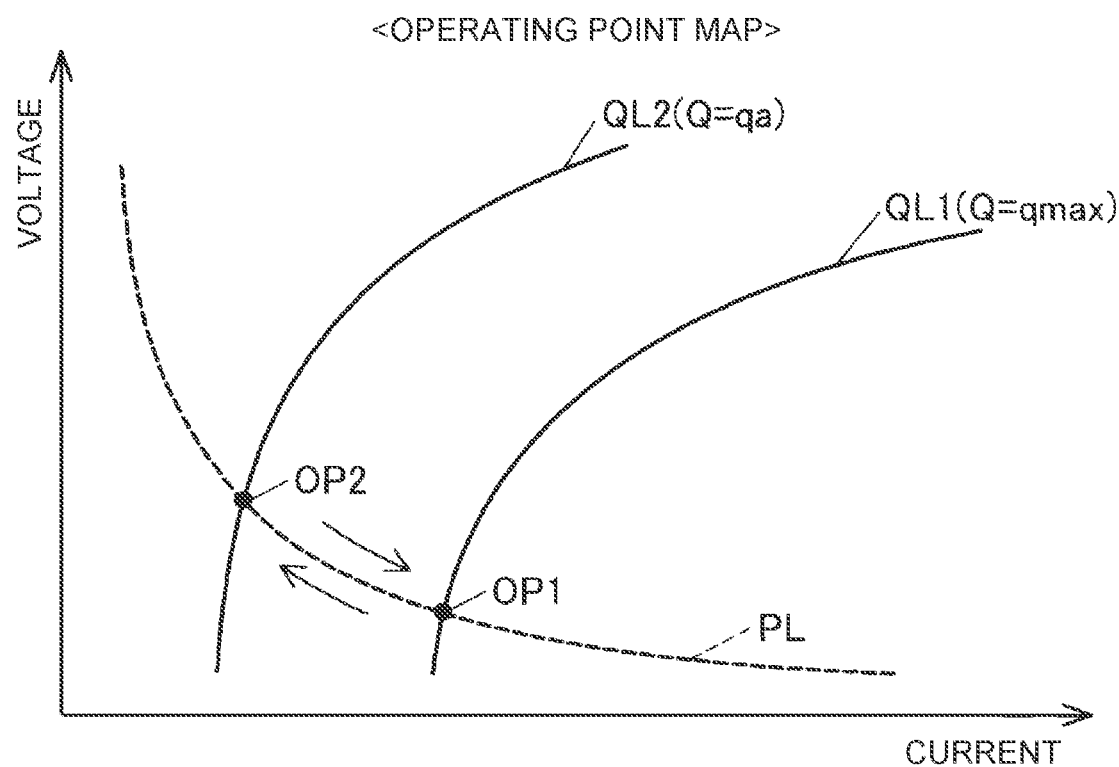
FIG. 9 is a diagram showing an operating point map for determining a target operation point according to a third embodiment.

FIG. 9 is a diagram illustrating an operating point map for determining a target operating point in the warm-up operation of the fuel cell 10. The operating point determined using FIG. 9 is an operating point in the warm-up operation, and is a low efficiency operating point having efficiency being lower than that of the reference operating point, as described above. The horizontal axis of FIG. 9 indicates the current of the fuel cell 10, and the vertical axis indicates the voltage of the fuel cell 10. FIG. 9 shows an equal power line PL indicating operating points where the power generation amounts are the same and equal Q lines QL1, QL2 indicating operating points where the heat generation amounts are the same. Here, the heat generation amount is the amount of heat generated per hour in accordance with the power generation of the fuel cell 10. The equal Q lines QL1, QL2 have different heat generation amounts, the electric power generation amount of the equal Q line QL1 is a heat generation amount qmax, and the electric power generation amount of the equal Q line QL2 is a heat generation amount qa. The heat generation amount qmax is the maximum value of the target heat generation amount set in the warm-up operation, and is larger than the heat generation amount qa. In the normal operation, the target operating point is set in accordance with the required power generation amount. On the other hand, in the warm-up operation, the target heat generation amount is determined, and the target operating point is determined in accordance with the determined target heat generation amount. Specifically, an intersection point between the equal Q line of the target heat generation amount and the equal power line of the target power generation amount is set as the target operating point. In the warm-up operation, the fuel cell 10 is operated in an operation range in which the amount of change in the output voltage with respect to the amount of change in the air stoichiometric ratio is large, and the target power generation amount is fixed to a predetermined value. That is, the operation point in the warm-up operation is set to the operating point on the equal power line PL in FIG. 9. Further, the rotation speed of the air compressor 23 is fixed to a predetermined value, and the total air flow rate Va supplied to the fuel cell system 100 is fixed to a predetermined value. In the warm-up operation, in order to shorten the warm-up operation time, it is preferable to set the target heat generation amount as large as possible. Therefore, the warm-up operation is started at the target operating point in accordance with the heat generation amount qmax. Specifically, the operation is started at a target operating point OP1 that is the intersection point between the equal Q line QL1 having the heat generation amount qmax and the equal power line PL. The target power generation amount per hour in the warm-up operation is, for example, 10.3 kW. The heat generation amount qmax is, for example, 56 kW per hour.

As described in the first embodiment, the exhaust hydrogen concentration Ch can be calculated using Equation (3) using the pumping hydrogen cell number Nh and the sweep current I. Here, the sweep current I is a current extracted from the fuel cell 10 by the DC/DC converter 72. The exhaust hydrogen concentration Ch is, more specifically, a concentration in the oxidizing off gas discharge pipe 25 downstream of a connection point between the oxidizing off gas discharge pipe 25 and the bypass pipe 24. Further, the total air flow rate Va is a fixed value. The total air flow rate Va is the flow rate of air supplied from the air compressor 23 to the fuel cell system 100, and more specifically, the total amount of the flow rate of the air supplied to the fuel cell 10 and the flow rate of the air flowing through the bypass pipe 24. Here, in the third embodiment, the pumping hydrogen amount Vh substituted for Equation (3) is calculated using Equation (4) below. Equation (4) is different from Equation (1) in that Equation (4) does not include the correction coefficient CF included in Equation (1).

$$Vh = CF \times I/(2 \times F) \times 22.4 \times 60 \times Nh \qquad \text{Equation (4)}$$

As described above, the cell voltage decreases in the cell 90 in which the pumping hydrogen is generated. Therefore, in the first embodiment, the number of cells 90 having the cell voltage being the first voltage threshold Vs1, which is a value higher than 0 V, or less is counted, and the correction coefficient CF is used to correct, for example, the erroneous counting in which the cell in which the pumping hydrogen is not actually generated is counted as the pumping hydrogen generation cell that is the specified cell. Here, the cell voltage of the pumping hydrogen generation cell is typically a negative voltage. Therefore, in the third embodiment, the first voltage threshold Vs1 is set to, for example, 0 V, and the cell 90 having the cell voltage of 0 V or less is counted as the pumping hydrogen generation cell. The pumping hydrogen amount Vh is then calculated without performing the correction using the correction coefficient CF. When Equations (4) and (2) are substituted for Equation (3) and arranged, Equation (5) below is obtained.

$$Ch=2Nh/(4F/I\times Va/(22.4\times 60)-Na+3Nh) \quad \text{Equation (5)}$$

Here, the inventors have focused that when the total air flow rate Va is set to a fixed value, the exhaust hydrogen concentration Ch can be calculated based on the pumping hydrogen cell number Nh and the sweep current I, and therefore, a correlation between the pumping hydrogen cell number Nh and the sweep current I can be defined in advance for each exhaust hydrogen concentration Ch. The fuel cell 10 is operated at the operating point where the sweep current I is obtained based on the correlation between the pumping hydrogen cell number Nh and the sweep current I at which the exhaust hydrogen concentration Ch becomes equal to or lower than the reference concentration such that the control of the fuel cell 10 that controls the exhaust hydrogen concentration Ch is equal to or less than the reference concentration. The details will be described below.

Figure 10:
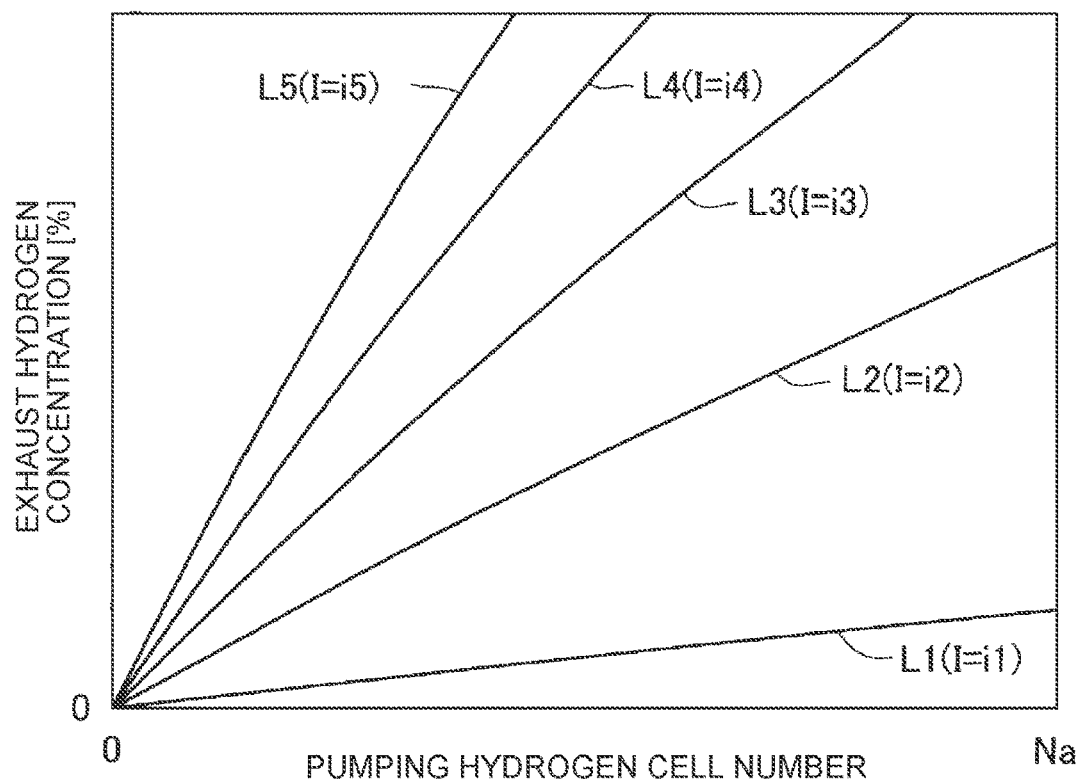
FIG. 10 is a diagram showing a correlation between the number of pumping hydrogen cells and the exhaust hydrogen concentration for each sweep current according to the third embodiment.

FIG. 10 is a diagram showing the correlation between the pumping hydrogen cell number Nh and the exhaust hydrogen concentration Ch for each sweep current I, which is calculated using Equation (5). Characteristic lines L1 to L5 indicate sweep currents i1 to i5, respectively, and the current value of the sweep current I gradually increases in the order of the characteristic lines L1, L2, L3, L4, and L5. As shown in FIG. 10, when the pumping hydrogen cell number Nh is the same, the exhaust hydrogen concentration Ch becomes higher as the sweep current I increases. Further, when the sweep current I is the same, the exhaust hydrogen concentration Ch becomes higher as the pumping hydrogen cell number Nh increases.

Figure 11:
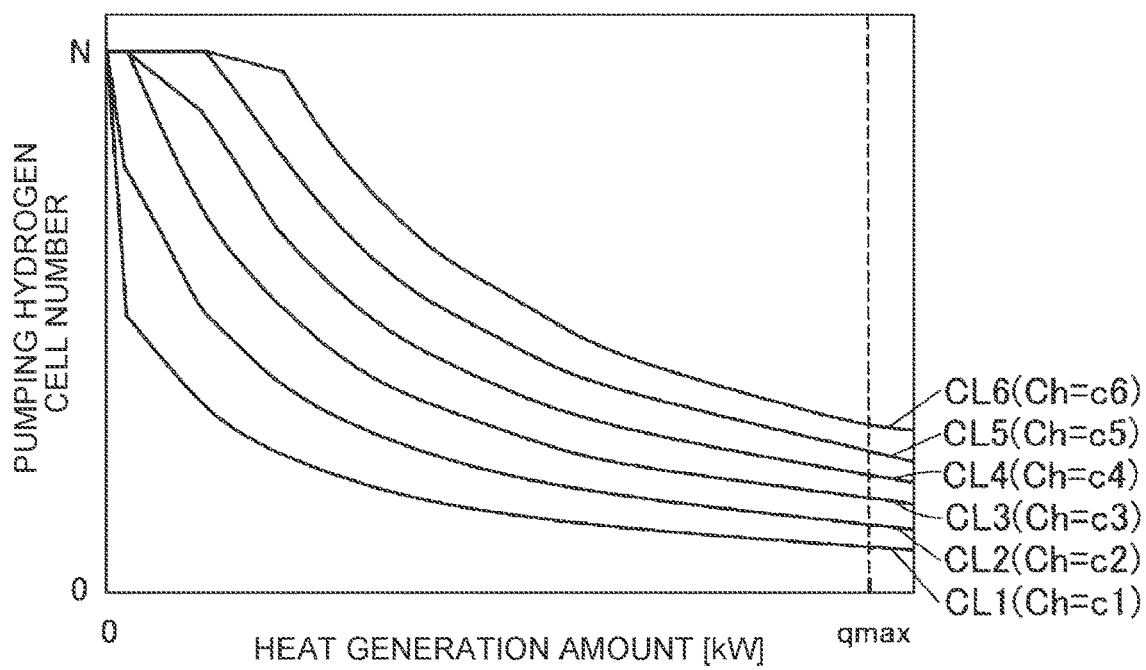
FIG. 11 is a diagram showing a correlation between a generation amount and the number of the pumping hydrogen cells for each exhaust hydrogen concentration according to a third embodiment.

FIG. 11 is a map that defines a correlation between the heat generation amount and the pumping hydrogen cell number Nh for each exhaust hydrogen concentration. The map shown in FIG. 11 is a map including a reference map used in exhaust hydrogen concentration control processing to be described later. The reference map is a map when the fuel cell 10 is caused to generate power at operating points on the equal power line, and the total air flow rate Va, which is the amount of air supplied to the fuel cell system 100 by the air compressor 23, is a fixed value. As shown in Equation (5), when the total air flow rate Va and the total cell number Na are fixed values, the exhaust hydrogen concentration Ch is calculated using the sweep current I and the pumping hydrogen cell number Nh. As described above, in the third embodiment, the target heat generation amount is determined, the target operation point is determined in accordance with the target heat generation amount, and the fuel cell 10 is controlled to be operated at the determined target operation point. Therefore, the map shown in FIG. 11 defines the correlation between the heat generation amount and the pumping hydrogen cell number Nh, instead of the sweep current I. According to the third embodiment, in the warm-up operation, the control unit 80 operates the fuel cell 10 at the operating point on the equal power line PL. Therefore, the sweep current I and the required heat generation amount can be associated with each other on a one-to-one basis. Accordingly, the correlation between the heat generation amount and the pumping hydrogen cell number Nh can be defined in advance. Specifically, the sweep current I can be converted to the heat generation amount using the operating point map shown in FIG. 9, for example. As shown in FIG. 10, when the pumping hydrogen cell number Nh and the exhaust hydrogen concentration Ch are determined, the sweep current I is uniquely determined. As shown in FIG. 9, when the sweep current I is determined, the heat generation amount is uniquely determined. The exhaust hydrogen concentrations Ch of characteristic lines CL1 to CL6 are concentrations c1 to c6, respectively. The exhaust hydrogen concentration Ch gradually increases in the order of the characteristic lines CL1, CL2, CL3, CL4, CL5, and CL6. As shown in FIG. 11, in order to reduce the exhaust hydrogen concentration Ch to, for example, the concentration c3 or less, the operating point of the fuel cell 10 may be set to an operating point having a smaller heat generation amount as the pumping hydrogen cell number Nh increases.

Figure 12:
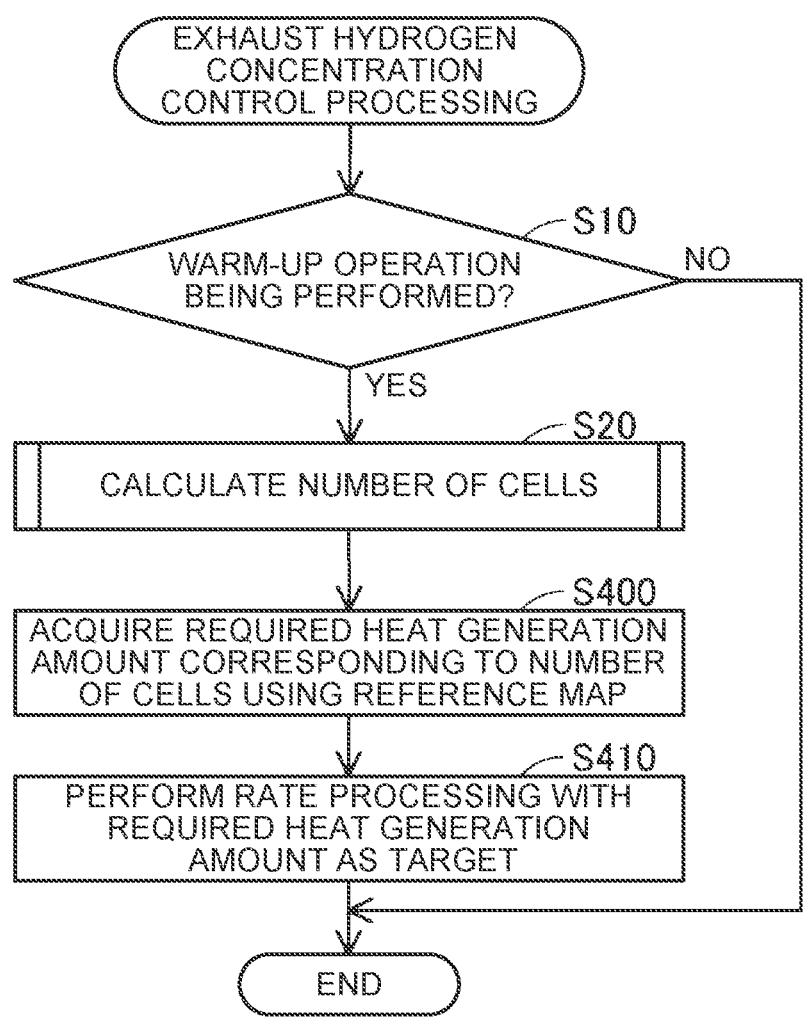
FIG. 12 is a flow chart of exhaust hydrogen concentration control processing according to the third embodiment.

The exhaust hydrogen concentration control processing according to the third embodiment will be described with reference to FIG. 12. The same steps as those in the first embodiment are denoted by the same reference signs, and detailed description thereof will be appropriately omitted. After the start-up, the control unit 80 repeatedly executes the exhaust hydrogen concentration control processing. The control unit 80 executes steps S10 and S20. As described above, in step S20 according to the third embodiment, the first voltage threshold Vs1 is set to 0 V, for example. The control unit 80 uses the reference map shown in FIG. 13 to acquire the required heat generation amount corresponding to the pumping hydrogen cell number Nh that is calculated in step S20 at a predetermined reference concentration (step S400).

Figure 13:
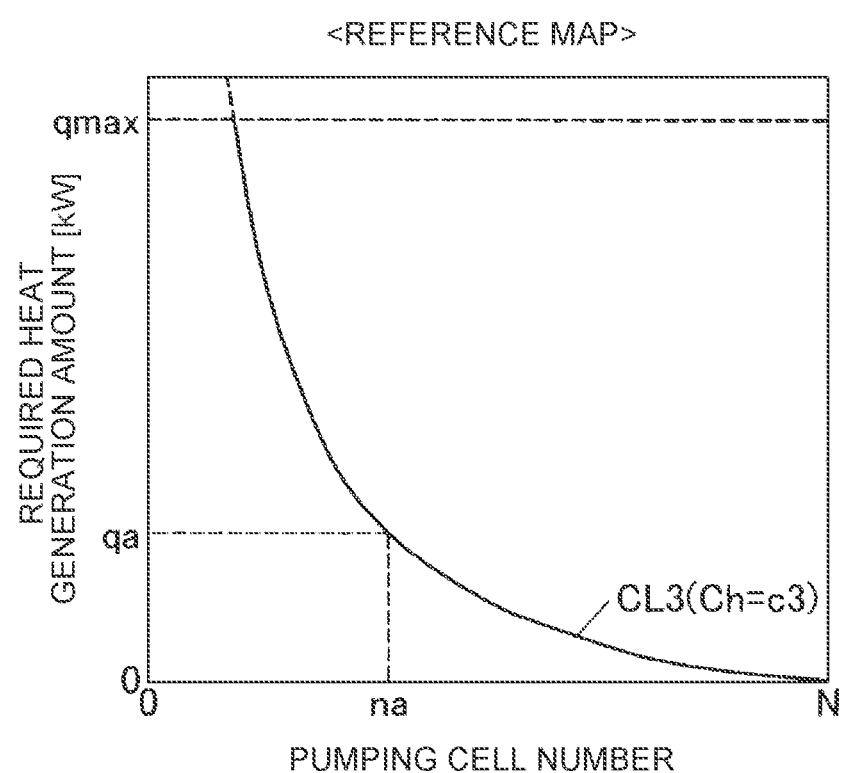
FIG. 13 is a diagram showing a reference map that defines a correlation between the number of the pumping hydrogen cells and a required heat generation amount according to the third embodiment.

The reference map shown in FIG. 13 shows the heat generation amount qmax, and the characteristic line CL3 indicating that the exhaust hydrogen concentration Ch is the concentration c3, among the characteristic lines CL1 to CL6 shown in FIG. 11. Note that the axes are different between FIG. 11 and FIG. 13. The horizontal axis of FIG. 13 is the pumping hydrogen cell number Nh, and the vertical axis is the required heat generation amount [kW]. In the third embodiment, a fixed concentration is set in advance as the reference concentration. The reference concentration is the concentration c3. The storage device 81 stores in advance a reference map in which the exhaust hydrogen concentration Ch is the concentration c3. The control unit 80 can acquire the required heat generation amount corresponding to the pumping hydrogen cell number Nh that is the reference concentration by referring to the reference map in which the exhaust hydrogen concentration Ch is the concentration c3.

After executing step S400 (FIG. 12), the control unit 80 executes rate processing with the required heat generation amount as the target value (step S410). The rate processing is processing of changing a change rate that is an amount of change in the heat generation amount per unit time to a predetermined reference rate in the process of changing the operating point corresponding to the current target heat generation amount to the operating point corresponding to a new target heat generation amount. Here, the reference rate is, for example, 12 [kW/sec] for both an increase rate and a decrease rate. Execution of the rate processing can suppress a rapid change in the heat generation amount. Specifically, the control unit 80 adjusts the air flow rate of the fuel cell 10 by adjusting the opening degree of the bypass valve 27, and uses the DC/DC converter 72, for example, to change the sweep current of the fuel cell 10 at a rate corresponding to the reference rate so as to switch the operating point of the fuel cell 10. For example, as shown in FIG. 13, when the pumping hydrogen cell number Nh is the number na, the required heat generation amount acquired in step S400 is the heat generation amount qa. In this case, as shown in FIG. 9, the operating point corresponding to the new target heat generation amount is a target operating point OP2. Therefore, when the current operating point is the target operating point OP1, the operating point is switched to the new target operating point OP2 along the equal power line PL. When there is any cell 90 in which the pumping hydrogen is generated, the sweep current I is reduced as the operating point is switched to an operating point with higher efficiency, which reduces the exhaust hydrogen concentration Ch. Further, for example, when the temperature of the fuel cell 10 increases and the pumping hydrogen cell number Nh decreases, the operating point is switched from the target operating point OP2 to the target operating point OP1, for example. In this case, the exhaust hydrogen concentration is maintained at the reference concentration or less, and the control for increasing the heat generation amount is executed. As described above, during the warm-up operation, steps S20, S400, and S410 are executed such that the exhaust hydrogen concentration is maintained at the reference concentration or less, and the control is executed to increase the heat generation amount as much as possible. This makes it possible to shorten the warm-up operation time.

According to the third embodiment as described above, the control unit 80 can execute the control of the fuel cell 10 under which the exhaust hydrogen concentration Ch becomes the reference concentration by setting the heat generation amount associated with the calculated pumping hydrogen cell number Nh as the required heat generation amount using the reference map in which the pumping hydrogen cell number Nh as the number of specific cells is associated with the required head generation amount such that the exhaust hydrogen concentration Ch that is accurately calculated using the number of the pumping hydrogen cell number Nh as the number of specific cells becomes the reference concentration or less.

D. Other Embodiments (D1) In the exhaust hydrogen determination processing according to the first embodiment, the first estimated hydrogen concentration Ca and the second estimated hydrogen concentration Cb are calculated and each is compared with the concentration threshold value. On the other hand, the processing may include calculation of either of the first estimated hydrogen concentration Ca and the second estimated hydrogen concentration Cb and executing the hydrogen concentration reduction processing when the calculated concentration is the concentration threshold value or higher. As a result, the number of processing steps can be reduced, and a load related to the exhaust hydrogen determination processing can be reduced.

(D2) The cell number calculation processing according to the second embodiment is the processing of counting the number of the pumping hydrogen cells in the fuel cell system provided with the voltage sensors 12 that each detect the voltage in unit of two cells 90. Also in the fuel cell system in which the voltage sensor 12 that detects the voltage in unit of three or more cells 90 is provided, the pumping hydrogen cell number can be counted using a method similar to the second embodiment by increasing the reference voltage that is used to determine whether the pumping hydrogen is generated. For example, in the case of the configuration including the voltage sensors 12 that each detect the voltage in unit of three cells 90, the pumping hydrogen cell number can be counted using, in addition to the first reference voltage to specify the voltage sensor 12 that detects the voltage of three cells 90 in which the pumping hydrogen is generated, the reference voltage to specify the voltage sensor 12 that detects the voltage of three cells 90 including two cells 90 in which the pumping hydrogen is generated, and the reference voltage to specify the voltage sensor 12 that detects the voltage of three cells 90 including one cell 90 in which the pumping hydrogen is generated.

(D3) In the first embodiment, a different correction coefficient CF is applied in accordance with the start-up temperature (see FIG. 5). On the other hand, the same correction coefficient may be applied regardless of the start-up temperature. Consequently, the processing load can be reduced.

(D4) In the second embodiment, a different second voltage threshold Vs2 is applied in accordance with the current temperature (see FIG. 8). On the other hand, the same second voltage threshold Vs2 may be applied regardless of the current temperature. Consequently, the processing load can be reduced.

(D5) In the first embodiment, in the hydrogen concentration reduction processing, the operating point of the fuel cell 10 is changed to the high efficiency operating point having a higher efficiency than that of the current operating point, and the generation amount of pumping hydrogen is reduced and the exhaust hydrogen concentration is reduced. On the other hand, in the hydrogen concentration reduction processing, processing of increasing the flow rate of the air flowing through the bypass pipe 24 and reducing the hydrogen concentration without changing the operating point of the fuel cell 10 may be executed.

(D6) The hydrogen concentration reduction processing in the first embodiment is, for example, the processing of reducing the target current value to be smaller than the present set value. In addition to the above, as the hydrogen concentration reduction processing, the exhaust hydrogen concentration Ch may be reduced by increasing the total air flow rate Va and diluting the cathode off gas that is discharged from the cathode of the fuel cell 10 with air.

(D7) In the third embodiment, the heat generation amount corresponding to the pumping hydrogen cell number Nh is determined using the reference map that defines the correlation between the required heat generation amount and the pumping hydrogen cell number Nh at which the exhaust hydrogen concentration becomes the reference concentration such that the operating point corresponding to the determined heat generation amount is determined. On the other hand, a configuration may be used in which the sweep current as the required current amount is determined using the map that defines the correlation between the sweep current and the pumping hydrogen cell number Nh such that the exhaust hydrogen concentration becomes the reference concentration and the operating point corresponding to the determined sweep current is determined. The control on the fuel cell 10 under which the exhaust hydrogen concentration becomes the reference concentration can be executed by setting the sweep current amount associated with the calculated cell number as the required current amount using the reference map in which the sweep current is associated with the number of specific cells such that the exhaust hydrogen concentration becomes the reference concentration.

(D8) In the third embodiment, the reference concentration is predetermined. On the other hand, for example, the reference concentration may be variably set in accordance with the temperature, etc. When the reference concentration is variably set, the processing may include determining the heat generation amount corresponding to the pumping hydrogen cell number Nh using the reference map of the reference concentration that is changed using the reference map that defines the correlation between the required heat generation amount and the pumping hydrogen cell number Nh for each reference concentration, and determining the operating point corresponding to the determined heat generation amount.

(D9) In the third embodiment, the total air flow rate Va is fixed during the warm-up operation. On the other hand, the total air flow rate Va may be variably set. When the total air flow rate Va is variably set, the required heat generation amount corresponding to the changed total air flow rate Va is obtained by using the predetermined correlation between the pumping hydrogen cell number Nh and the required heat generation amount for each total air flow rate Va, and the fuel cell 10 is caused to operate with the acquired required heat generation amount as the target value such that the exhaust hydrogen concentration Ch can be the reference concentration or less.

(D10) In the third embodiment, the control unit 80 controls the fuel cell 10 at an operating point on one equal power line PL in the warm-up operation. On the other hand, the target power generation amount may be variably set. In the case of the configuration in which the target power generation amount is variably set, the processing may include determining a new target power generation amount and setting an operating point corresponding to the new target power generation amount and a new required heat generation amount as the changed operating point using the reference map including the plurality of the equal power lines PL.

(D11) In the third embodiment, the exhaust hydrogen concentration control processing is executed during the warm-up operation. However, the exhaust hydrogen concentration control processing may be executed during the normal operation. For example, the exhaust hydrogen concentration control processing may be executed to operate the fuel cell 10 at the low efficiency operating point when the fuel cell system 100 includes a secondary battery that functions as a power source of the fuel cell system 100, and it is desired to limit the charge and discharge amount of the secondary battery. With this configuration, the exhaust hydrogen concentration Ch can be made equal to or less than the reference concentration while limiting the output current and suppressing the generation of surplus electric power.

(D12) In the third embodiment, the pumping hydrogen amount Vh is calculated using Equation (4). The pumping hydrogen amount Vh may be calculated using Equation (1) as in the first embodiment, instead of using Equation (4).

(D13) In the third embodiment, the reference rate when changing the operating point is, for example, 12 [kW/sec] for both the increase rate and the decrease rate. The reference rate is not limited to this value, and the increase rate and the decrease rate may be different values.

(D14) In the third embodiment, the rotation speed of the air compressor 23 is fixed to a predetermined value, and the total air flow rate Va of the air supplied to the fuel cell system 100 is fixed to a predetermined value. On the other hand, in the warm-up operation, the rotation speed of the air compressor 23 may be changed. When the rotation speed of the air compressor 23 is changed, the total air flow rate Va also changes. When the rotation speed of the air compressor 23 is changed and the total air flow rate Va is changed, for example, the following configuration may be applied. A map that defines the correlation between the heat generation amount and the pumping hydrogen cell number Nh in which the exhaust hydrogen concentration Ch becomes the reference concentration is stored in the storage device 81 in advance. The heat generation amount corresponding to the pumping hydrogen cell number Nh is set as the required heat generation amount in the map corresponding to the total air flow rate Va in accordance with the changed rotation speed of the air compressor 23. This makes it possible to control the fuel cell 10 in which the exhaust hydrogen concentration Ch becomes the reference concentration.

The present disclosure is not limited to the embodiments above, and can be realized with various configurations without departing from the spirit of the present disclosure. For example, the technical features of the embodiment corresponding to the technical features in each mode described in the section of the summary may be replaced or combined appropriately to solve some or all of the above issues or to achieve some or all of the above effects. When the technical features are not described as essential in this specification, the technical features can be deleted as appropriate.

What is claimed is:
1. A fuel cell system comprising:
a fuel cell in which cells are stacked;
a voltage sensor configured to detect a voltage in unit of one or more of the cells;
a control unit configured to calculate, among the stacked cells, the number of specific cells in which the voltage detected by the voltage sensor is equal to or less than a predetermined first reference voltage, and cause the fuel cell to operate based on the calculated number of the specific cells; and
a storage device storing a reference map in which a required heat generation amount is associated with the number of the specific cells such that an exhaust hydrogen concentration is equal to or less than a reference concentration, and the required heat generation amount decreases as the number of the specific cells increases, wherein
the control unit is configured to:
calculate the number of the specific cells based on the detected voltage;
acquire the required heat generation amount associated with the calculated number of the specific cells based on the reference map; and
cause the fuel cell to operate with the acquired required heat generation amount as a target value.

2. A method of controlling a fuel cell system including a fuel cell in which cells are stacked and a voltage sensor that detects a voltage in unit of one or more of the cells, the method comprising:
calculating, among the stacked cells, the number of specific cells in which the voltage detected by the voltage sensor is equal to or less than a predetermined first reference voltage; and
acquiring a required heat generation amount associated with the calculated number of the specific cells based on a reference map in which the acquired heat generation amount is associated with the number of the specific cells and the required heat generation amount decreases as the number of the specific cells increases, and causing the fuel cell to operate with the acquired required heat generation amount as a target value.

\* \* \* \* \*